United States Patent [19]

Marks

[11] Patent Number: 4,790,514
[45] Date of Patent: Dec. 13, 1988

[54] REMOTE CONTROL VALVE OPERATOR

[76] Inventor: Harold L. Marks, Rte. 1, Box 29AA, Burnsville, W. Va. 26335

[21] Appl. No.: 150,237

[22] Filed: Jan. 27, 1988

[51] Int. Cl.⁴ .............................................. F16K 31/05
[52] U.S. Cl. ........................... 251/129.03; 251/129.04; 251/129.11; 251/291
[58] Field of Search ................ 251/129.03, 14, 129.11, 251/129.12, 291, 129.04; 137/269

[56] References Cited

U.S. PATENT DOCUMENTS

| | | | |
|---|---|---|---|
| 2,924,105 | 2/1960 | Graham | 251/129.11 X |
| 4,093,179 | 6/1978 | Schmidt | 251/129.11 |
| 4,095,421 | 6/1978 | Silcox | 251/129.03 |
| 4,220,313 | 9/1980 | Peterson et al. | 251/129.03 X |

*Primary Examiner*—Arnold Rosenthal
*Attorney, Agent, or Firm*—Richard C. Litman

[57] ABSTRACT

A valve manipulating apparatus adapted to be remotely controlled includes a support assembly having one end releasably attachable adjacent a pipeline valve and another end supporting a longitudinally shiftable actuating assembly. A remotely excited, bi-directional motor in the actuating assembly engages the stem of the valve and is operable to alternately open and close the valve by rotating same. As the valve is manipulated, its stem either extends or retracts and during this movement, a coupler on the motor shaft follows the valve stem displacement and produces a corresponding displacement of the actuating assembly. Switch devices on the actuating assembly cooperate with adjustable stop elements carried by the support assembly to provide for automatic stopping of the motor operation at prescribed points.

16 Claims, 1 Drawing Sheet

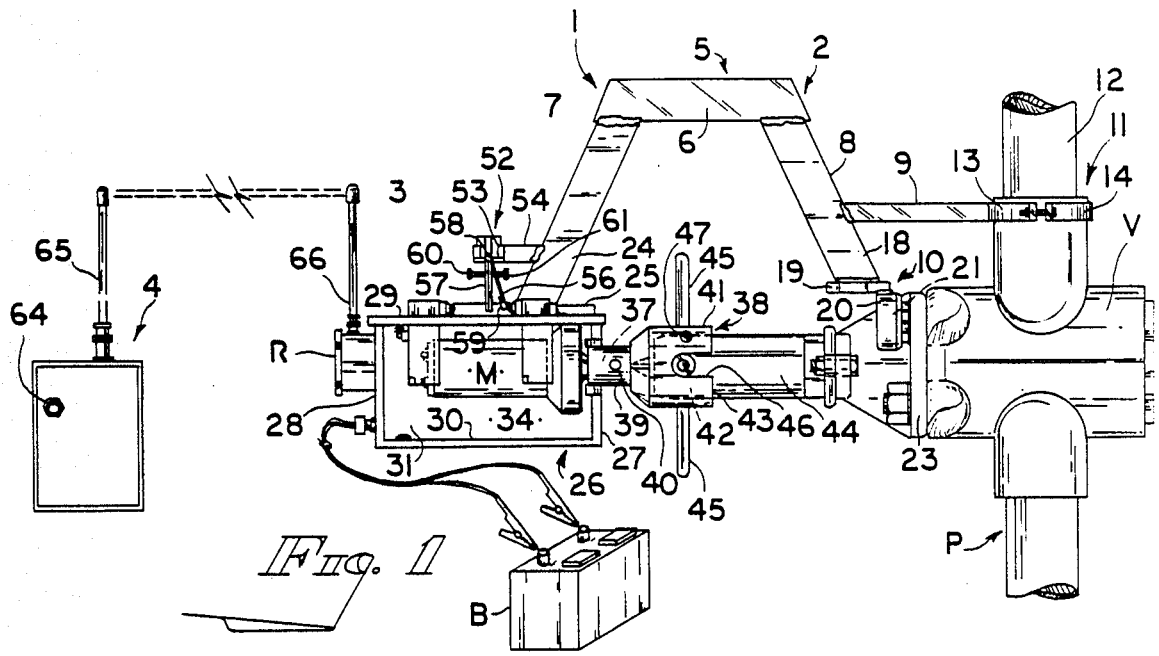
Fig. 1
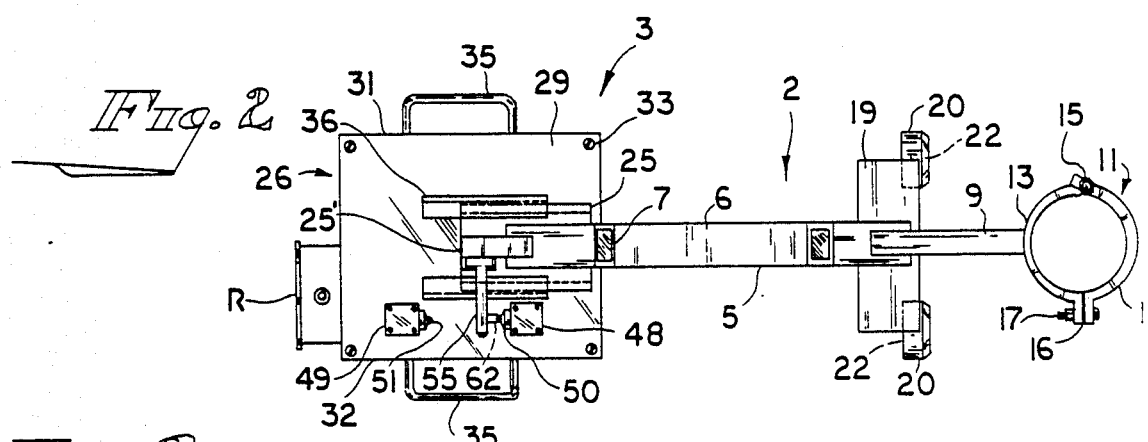
Fig. 2
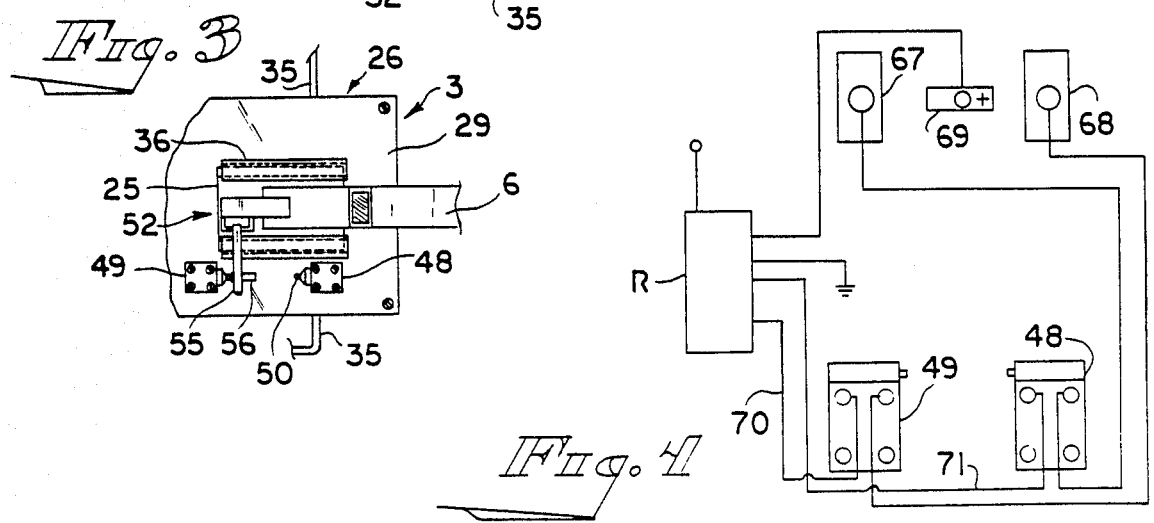
Fig. 3
Fig. 4

REMOTE CONTROL VALVE OPERATOR

BACKGROUND OF THE INVENTION

This invention relates generally, to valve operating devices and more particularly, to an improved valve actuating apparatus adapted to be remotely controlled.

The transmission of fluids through pipelines is most often regulated by the use of suitable displaceable valve members. In the majority of situations, the valve is operated by manually displacing the valve stem such as by turning a wheel affixed thereto. However, in the case of potentially dangerous installations, it is desirable to minimize risks to workers involved in the operation of valves and this may be achieved by allowing for indirect or remote actuation of the valves. In this manner, should a break occur in a valve or associated pipeline, the operator would not be injured or killed by either flying structural debris or escaping contents of the pipeline.

The use of a remotely controlled valve operator satisfies a primary concern, particularly in certain pipelines. This concern involves the safety of personnel in the vicinity of a valve, not the least of which is the actual individual assigned to open or close a valve. There have been recorded many instances whereby a worker has been at least maimed while operating a valve. Such injuries have resulted from numerous causes including faulty valve housings, bonnet fasteners or seals or even failure of the threaded juncture between the valve housing and associated pipe strings. These failures of course may be further induced by a sudden excessive pressure within the pipeline system although it will be appreciated that a mechanical flaw in the pipe or valve structure can lead to a structural failure at practically any pressure within the system. Although well head valves as used in the natural oil and gas industry quite obviously may employ and benefit from use of the present invention, it will be appreciated that valved pipelines as used in other industries, such as chemical or steam pipelines, may utilize a remote valve operator.

Several devices have been suggested in the past for remotely operating a pipeline valve. U.S. Pat. No. 3,387,748 issued June 11, 1968 to Brenchley discloses an electric motor attached to a pipeline valve and actuated by a timing device remotely joined to the motor by wiring. Another example will be found in U.S. Pat. No. 3,972,506 wherein, a motor stationed adjacent a valve and joined thereto by a flexible shaft, is controlled from a remotely disposed location. In both of these prior assemblies, special provision is required for the support of the motor unit while modification of the valve stem is also necessary, to accommodate the motor output.

SUMMARY OF THE INVENTION

By the present invention, an improved valve actuating mechanism is provided which readily lends itself to quick and easy removable attachment to the stem of a valve housing. This attachment is achieved by means of a cantilever support assembly, one end of which includes a pipe clamp and a plurality of valve engaging anchor elements. The other end is provided with an attachment foot supporting a motor-containing actuating assembly and allowing axial displacement of the actuating assembly during opening and closing of a valve.

Activation of the motor is accomplished from a remote location by means of a controller, preferably a radio transmitter, and which activates a receiver regulating operation of the motor. When the motor is thusly activated, a coupler on its shaft and engageable with the valve stem, rotates the stem to open or close the associated valve element.

As the valve stem rotates, it will be understood that it simultaneously extends or retracts with respect to the valve housing and this displacement produces a simultaneous, equal axial displacement of the entire motor assembly, through a unique supporting assembly attaching the entire mechanism to the pipeline and valve.

Accordingly, one of the objects of the present invention is to provide an improved valve operator which is remotely controlled and includes a motor having a shaft maintained in axial alignment with a valve stem by a cantilever support assembly.

Another object of the present invention is to provide an improved motor-driven valve operator including an arcuately movable valve stem coupler which is rectilinearly shiftable as the valve is opened and closed under the control of a remotely situated operator.

A further object of the present invention is to provide an improved remotely controlled valve operator having a motor assembly slidably suspended from a support assembly attached to a pipeline and valve and including switch elements automatically limiting the travel of the motor assembly during both opening and closing of a valve.

Still another object of the present invention is to provide an improved valve operator provided with a motor housing having a valve stem coupler maintained in engagement with a valve stem through a support assembly including stabilizer elements respectively engageable with a pipeline and valve housing.

With these and other objects in view which will more readily appear as the nature of the invention is better understood, the invention consists in the novel construction, combination and arrangement of parts hereinafter more fully illustrated, described and claimed, with reference being made to the accompanying drawings.

BRIEF DESCRIPTION OF THE DRAWINGS

FIG. 1 is a side elevation, partly in cross-section, of a valve operator according to the present invention, shown in the position when the valve is opened and including a remote, wireless controller;

FIG. 2 is a top plan view of the valve operator shown in FIG. 1, with the pipe string, valve and stem omitted for purposes of clarity;

FIG. 3 is a fragmentary top plan view illustrating the actuating assembly of FIG. 2 as it appears when the valve is closed; and FIG. 4 is a diagrammatic view of a typical circuit employed to remotely control the actuation of the valve operator.

Similar reference characters designate corresponding parts throughout the several figures of the drawings.

DESCRIPTION OF THE PREFERRED EMBODIMENT

Referring now to the drawings, particularly FIG. 1, the valve operator apparatus of the present invention, generally designated 1, will be seen to include three primary components namely, a support assembly 2, actuating assembly 3 and remote controller 4. It will be understood that the apparatus readily lends itself to portability, with each of the components capable of easily being carried by a single person, to and from a site of intended use.

The actuating component 3 comprises a separate assembly adapted to be displaceably retained in position by means of the support assembly 2. This support assembly includes means for both axially and angularly stabilizing the mounted actuating assembly 3 with respect to the valve V desired to be operated by the invention.

The support assembly 2 comprises a cantilever arrangement which will be seen to have one end attachable to a pipeline and valve with the opposite end supporting the actuating assembly 3. An inverted, generally U or V-shaped support bracket 5 comprises a horizontally disposed top arm 6 from which extends a rear arm 7 on the one end and a front arm 8 from the opposite end. This front arm 8 includes structure for rigidly stabilizing the entire apparatus, by means of a pipeline arm 9 and a valve spanner mechanism 10. The arm 9 comprises an elongated, horizontally disposed member, having one end affixed to the intermediate portion of the inclined front arm 8, and the other end attached to a pipe clamp 11. The clamp is adapted to be rigidly attached about the periphery of either a pipe string 12 of a pipeline P or the cylindrical portion of a valve V and preferably comprises a split clamp or pair of clamp sections 13-14, as shown most clearly in FIG. 2 of the drawings. The semi-circular sections are hinged together as at 15 and each includes an apertured flange 16 at the other end, for the reception of an appropriate tightening fastener 17.

The valve spanner mechanism 10 is attached to the valve or free end 18 of the support bracket front arm 8 and includes a horizontally disposed spanner element 19, in turn supporting a pair of laterally spaced apart anchor sockets 20—20. The two sockets are mounted at points intended to axially align with two spaced apart fasteners 21—21 associated with the valve V to which the invention is applied. Accordingly, it will be understood that each socket is provided with a non-circular bore 22, of a configuration selected to provide a close fit about the fastener elements 21. These latter elements 21 may comprise hex nuts or bolt heads as used to secure the bonnet 23 upon the main body of the valve V.

By means of the above described support assembly 2 it will be seen that positive means are provided for both longitudinally and angularly securing a cantilevered arm arrangement with respect to a valve V disposed within a pipeline P. The opposite or actuating assembly end 24 of the rear arm 7 carries a horizontally disposed slide plate 25 upon which is supported the axially displaceable actuating assembly 3. This assembly comprises a housing 26 having opposite front and rear walls 27,28, top and bottom walls 29,30 and opposed side walls 31,32. al suitably jointed, such as by machine screws 33, to define an interior cavity 34. For ease of transporting the assembly 3 and facilitating its connection with the support assembly 2, a handle 35 is provided on each side wall 31,32. This connection is accomplished through guide means such as the spaced tracks 36—36 on the housing top wall 29 and which form, with the support assembly slide plate 25, a close sliding fit, in a rectilinear direction aligned with the front of the support assembly attached to the valve V.

Motive power for operation of the device is supplied by a geared electric motor M suitably anchored within the cavity 34 of the housing 26 and which includes a drive shaft 37 projecting through and forwardly of the front wall 27. A coupler 38 is mounted upon this motor shaft 37 and includes a rearmost collar 39 preferably completely surrounding the shaft 37 and secured thereto, as by a spring or roll pin 40. The forward portion of the coupler 38 is provided with an enlarged cup 41 having a central cavity 42 with a front opening 43.

Upon installation of the apparatus, the coupler cup 41 is adapted to surroundingly envelope the exposed end of the valve stem 44 as shown in FIG. 1. In this respect, the diameter of the cup cavity 42 is preferably only slightly greater than that of the valve stem 44 so as to minimize free play between the cooperating components during operation of the apparatus. The handles 45 projecting radially from the valve stem 44 and which are used to manually operate the valve V are retained and cooperate with a corresponding number of longitudinal slots 46 formed in the wall of the coupler cup 41. Thus, when the cup 41 is slipped over the stem 44 it will be appreciated that a positive angular interlocking is achieved between the coupler and valve stem. An axial interlocking is assured by means of a lock element such as the set screw 47 passing through the cup wall and adapted to be urged into biting engagement with the valve stem.

In use of the apparatus it will be understood that the support assembly 2 is initially installed by attaching the spanner mechanism anchor elements or sockets 20 to the two fasteners or nuts 21 on the valve V and with the support arm 6 horizontally disposed, the pipe clamp 11 is secured about the valve V. In this manner, the support assembly 2 will be rigidly mounted and thereafter, the actuating assembly 3 may be attached thereto by axially sliding the spaced tracks 36—36 about the slide plate 25 fixed to the support assembly 2. This axial movement is continued until the coupler cup 41 envelopes the end of the valve stem 44, with the stem handles 45 disposed within the cup slots 46. Tightening of the lock element 47 completes the mounting of the apparatus.

Activation of the motor M, which is capable of bi-directional rotation, causes the affixed coupler 38 to rotate the valve stem 44 thereby opening or closing same, depending upon the direction of motor rotation. During any such angular displacement of the valve stem it will be understood that a concurrent axial displacement thereof takes place. In other words, during left-hand rotation of the motor, coupler and stem, the valve is opened and the valve stem 44 is axially extended or, as viewed in FIG. 1 of the drawings, will be displaced to the left. The construction of the valve V producing this axial stem displacement is well known in the valve art and need not be described in detail herein.

During the aforementioned valve stem displacement it will be apparent that means must be provided to accommodate the corresponding axial displacement of the coupler 38 which, in effect, is axially fixed relative the motor M and housing 26. This accommodation is achieved through the described support assembly slide plate 25 and the cooperating guide means offered by the housing spaced tracks 36—36 which maintains a true axial alignment between the actuating assembly coupler and the valve stem, regardless of the axial position of the valve stem. Thus, FIGS. 1 and 2 will be seen to illustrate the relative position of the shiftable actuating assembly 3 and stationary support assembly 2 when the valve V is opened and its stem fully extended. In this position, the housing tracks 36—36 have been shifted to the left of the rear edge 25' of the support assembly slide plate 25, with the majority of this plate remaining engaged by the two tracks 36—36.

Upon activation of the motor M in the reverse direction, the coupler 38 rotates clockwise, thereby closing the valve V and causing its stem 44 to retract or axially move to the right in FIG. 1. Since the coupler cup 41 is fixed to the valve stem it will follow this axial displacement of the stem thereby concurrently moving the entire actuating assembly 3 likewise to the right, to the position as shown in FIG. 3. During this latter movement, a true axial alignment is assured as the two housing tracks 36—36 are displaced relative the captive support assembly slide plate 25.

When the motor M is activated, means must be provided to restrict its operation, once the valve is fully opened or closed. Accordingly, a first or open, limit switch 48 and a second or closed, limit switch 49 are attached to the housing 26. These switches are mounted along an axis parallel to the tracks 36—36 and include opposed actuating elements 50,51. Cooperating with the switches is a stop assembly 52 adapted to alternately engage and actuate the two switches 48,49. The stop assembly 52 preferably comprises a removable mechanism adapted to be inserted within a recess 53 or other receiving means provided within a bracket 54 affixed to the rear support assembly arm 7. The assembly 52 includes a fixed depending member 55 and a pair of adjustable stop arms namely, a valve open stop arm 56 and a valve closed stop arm 57. As shown most clearly in FIG. 1, these two stop arms are pivotally attached at their upper ends to the depending member 55, as at 58, with their lower ends 59 clear of the housing top wall 29. A pair of adjustment elements, such as set screws 60,61 pass through tapped bores within the depending member 55 and respectively engage the inner surface 62 of the two stop arms. Each set screw initially passes through an enlarged opening in one stop arm such that only the tip of either screw will engage the distant stop arm. In this manner, the two stop arms are independently adjustable to various angular positions thereby longitudinally positioning the respective lower end 59 to establish the point of engagement with either actuating element 50,51. The angular location of the stop arm 56 as shown in FIG. 1 reflects the position of this arm when the adjusting screw 60 has been tightened to cause its tip to deflect the arm 56 outwardly. As thus illustrated, the lower end 59 of the arm 61 will be seen to engage the actuating element 50 of the valve open limit switch 48 thereby halting the operation of the motor M as the valve V is fully opened. During operation of the motor in the opposite direction, to close the valve, it will be understood that the valve closed stop arm 57 serves to engage the actuating element 51 of the other, valve closed limit switch 49 to halt the motor as the actuating assembly 3 is axially shifted to the right with the retraction of the valve stem 44.

The remote control operation of the apparatus is preferably accomplished by means of any suitable radio frequency transmitter as contained in the remote controller 4 and which is adapted to communicate with an appropriate receiver R on the actuating assembly housing 26. A three-position switch 64 on the remote controller 4 is operable by a user, from a center, off position, to either a close or open position in order to transmit one of two signals from the transmitter antenna 65 to a receiving antenna 66.

The circuitry supporting the resulting operation of the motor M is shown in the diagrammatic view of FIG. 4. Current for driving the apparatus is supplied by suitable means such as a storage battery B and depending upon which of the two signals is sent to the receiver R, activates one of the two solenoids 67,68 to drive the motor M in the appropriate direction. A bus 69 common to one hot terminal of each solenoid, supplied one side of the current to operate the motor M while the other side of the motor current is derived from a selected one of the solenoids, depending upon which signal is received by the receiver R. For example, if one signal is sent by the remote controller 4, then a first circuit 70 is closed by the receiver R and which passes continuously through the normally closed limit switch 49 and thence to the solenoid 68. This will close the hot circuit and initiate rotation of the motor M in one direction, to close the valve V. The motor will continue to operate until the stop arm 57 engages the actuating element 51 of the limit switch 49 to interrupt the circuit 70.

When the user operates the remote controller switch 64 in the opposite direction, then the circuit 71 is activated by the receiver R and the other solenoid 67 is excited to begin rotation of the motor shaft 37 in a counter-clockwise direction. The valve stem 44 is axially displaced and concurrently moves the actuating assembly 3 away from the pipeline P until the stop arm 56 engages and closes the actuating element 50 of the limit switch 48. This interrupts the circuit 71 to halt operation of the motor, at a point corresponding to a full opening of the valve V.

From the above it will be apparent that precise control over the degree to which a valve is opened or closed may be achieved by regulating the setting of the screw elements 60,61 and most importantly, a safe operation of a valve may be carried out in view of the remote control of the motor M. A typical distance from which a user may operate the controller 4 is 125–400 feet from the actuating assembly 3.

I claim:

1. A remote control apparatus for manipulating a pipeline valve having a stem including;

a support assembly having a valve end and an opposite actuating assembly end, means removably attaching said support assembly valve end adjacent a valve stem, an actuating assembly including a housing, shiftable means attaching said housing to said support assembly actuating assembly end, a motor in said housing and having a shaft, coupling means on said shaft engageable with the valve stem, means interlocking said coupling means relative the valve stem, and said shiftable attaching means allowing relative longitudinal displacement between said support assembly and housing whereby, rotation of said motor, shaft, coupling means and engaged valve stem produces an axial extension or retraction of the valve stem and a corresponding axial displacement of said housing as said support assembly remains stationary.

2. A remote control apparatus according to claim 1 wherein, said removable attaching means includes a clamp assembly and a separate valve engaging spanner member attached to said support assembly.

3. A remote control apparatus according to claim 1 wherein, said support assembly defines a generally inverted U-shaped configuration whereby, said housing is attached to said support assembly in a cantilevered manner.

4. A remote control apparatus according to claim 1 including, a remotely located controller selectively operable to activate said motor.

5. A remote control apparatus according to claim 1 wherein, said shiftable means includes a slide plate carried by said support assembly actuating assembly end, and guide means on said housing slidably enveloping at least portions of said slide plate.

6. A remote control apparatus according to claim 1 wherein, said support assembly includes a horizontally disposed top arm repsectively joined to a front arm and a rear arm, and said arms angularly disposed relative said top arm.

7. A remote control apparatus according to claim 1 wherein, said housing includes circuit and switch means operable during axial displacement of said housing to cease rotation of said motor upon predetermined displacement of said housing.

8. A remote control apparatus according to claim 1 wherein, said coupling means includes a cup adapted to surround the end of a valve stem, and locking means on said cup precluding angular and axial displacement between said cup and the stem of a valve.

9. A remote control apparatus according to claim 2 wherein, said spanner member includes a pair of laterally spaced apart sockets adapted to surroundingly engage respective fastener elements on a valve.

10. A remote control apparatus according to claim 4 wherein, said actuating assembly includes a radio frequency receiver, and said controller comprises a radio frequency transmitter.

11. A remote control apparatus according to claim 5 wherein, said housing guide means includes a pair of tracks.

12. A remote control apparatus according to claim 7 wherein, said switch means includes a pair of longitudinally spaced apart limit switches each having an actuating element, and a stop assembly attached to said support assembly and having a stop arm provided with an end disposed within the horizontal plane of said actuating elements.

13. A remote control apparatus according to claim 8 wherein, said locking means includes a plurality of axially extending slots in said cup each adapted to receive a handle radially projecting from a valve stem, and a threaded fastener radially extending through said cup and operable to engage the stem of a valve disposed within said cup.

14. A remote control apparatus according to claim 10 including, switch means on said controller operable to transmit a selected one of two radio frequency signals, said motor adapted for bi-directional rotation, circuit means in said actuating assembly operable upon either of said two signals being received by said receiver to rotate said motor shaft in either of two directions.

15. A remote control apparatus according to claim 12 including, adjustable means on said stop assembly displaceable to alter the point of operation of said switch means by said arm.

16. A remote control apparatus according to claim 15 including, a pair of said arms each provided with said adjustable means.

* * * * *